G. WALLBILLICH.
EJECTOR.
APPLICATION FILED JULY 18, 1912.
1,061,429.
Patented May 13, 1913.
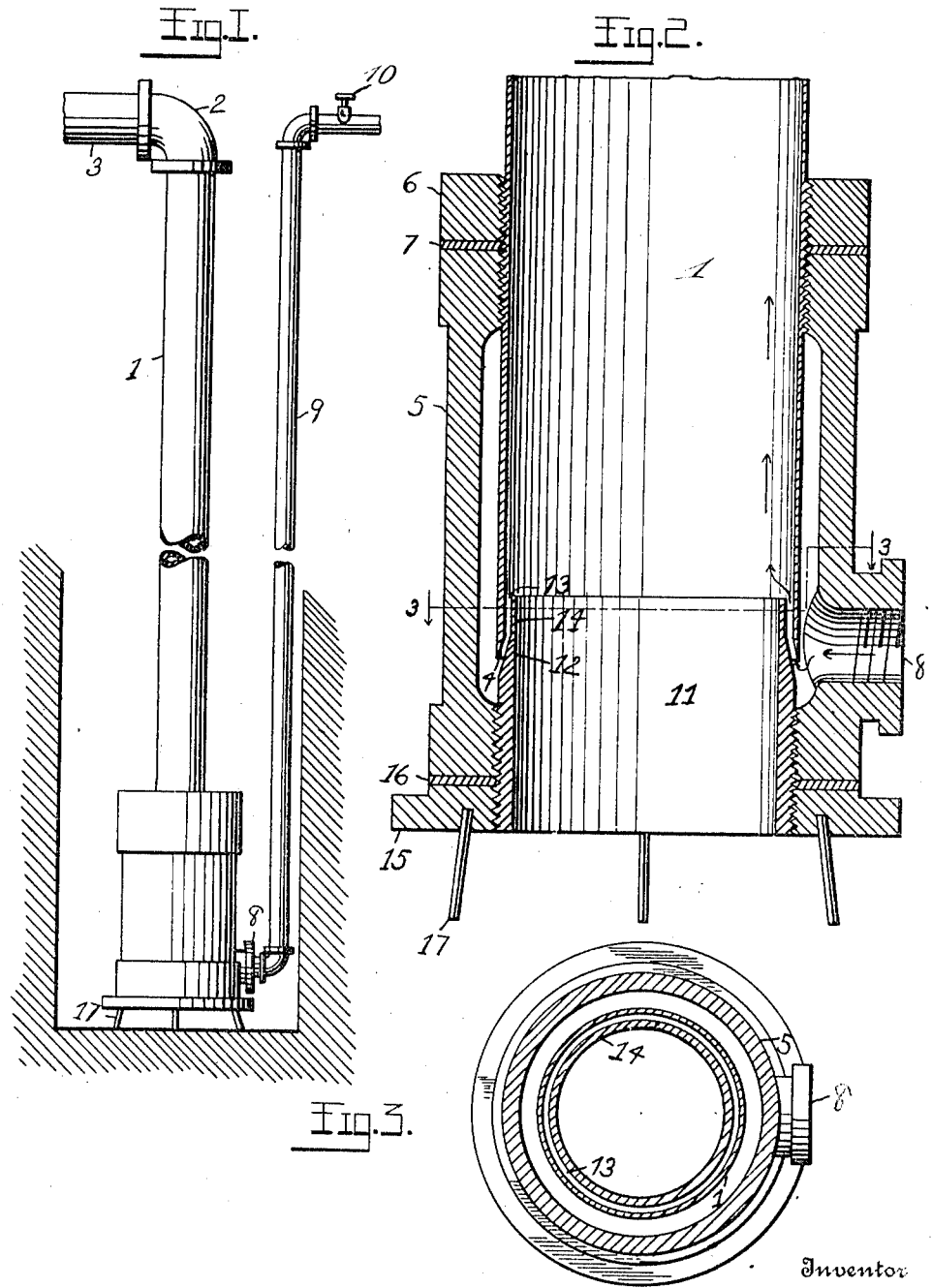
Witnesses
J. R. Hoge
C. E. Hunt
Inventor
G. Wallbillich
By H. B. Willson & Co.
Attorneys

UNITED STATES PATENT OFFICE.

GUSTAV WALLBILLICH, OF BROWN STATION, NEW YORK.

EJECTOR.

1,061,429.  Specification of Letters Patent.  Patented May 13, 1913.

Application filed July 18, 1912. Serial No. 710,292.

*To all whom it may concern:*

Be it known that I, GUSTAV WALLBILLICH, a citizen of the United States, residing at Brown Station, in the county of Ulster and State of New York, have invented certain new and useful Improvements in Ejectors; and I do declare the following to be a full, clear, and exact description of the invention, such as will enable others skilled in the art to which it appertains to make and use the same.

This invention relates to improvements in ejectors.

One object of the invention is to provide ejectors having means to control the admission of the air whereby the best results are obtained under varying conditions and in lifting different kinds of material.

Another object is to provide a lift of this character having means to prevent the air from breaking the column of water or other material being raised in the discharge pipe of the lift.

With these and other objects in view, the invention consists of certain novel features of construction, combination and arrangement of parts, as will be hereinafter described and claimed.

In the accompanying drawings:—Figure 1 is a side view of my improved lift; Fig. 2 is an enlarged central vertical sectional view of the lower portion thereof; and Fig. 3 is a cross sectional view on the line 3—3 of Fig. 2.

My improved ejector comprises a discharge pipe 1, which may be of any suitable size and of any desired length or height, and to the upper end of which may be connected any suitable form of fluid conducting pipe. Said discharge pipe 1 is here shown as having on its upper end an elbow 2, to which is connected a short discharge pipe 3. The lower end of the pipe 1 has its edge reamed out on the inner side to form a tapered or beveled surface 4, the purpose of which will be hereinafter described.

The lower portion of the pipe 1 is exteriorly-threaded for a suitable distance, and on said threaded end of the pipe is screwed the upper end of an air receiving sleeve or cylinder 5 having an interior diameter slightly larger than the outer diameter of the pipe 1, whereby an annular air space is formed around the pipe. On the pipe 1 above the sleeve or cylinder 5 is also screwed a stop nut 6, between which and the upper end of the collar 5 is a packing ring or gasket 7. The stop nut 6 forms a stop for securely holding the cylinder in position on the discharge pipe. On one side of the cylinder 5, preferably near its lower end, is a screw threaded projection 8, with which is connected an air supply pipe 9, by means of which air under pressure is conducted to the cylinder 5 of the lift. In the pipe 9 is arranged an air controlling valve 10.

Screwed into the threaded lower end of the cylinder 5 is an inlet or suction pipe 11, through which water or other material to be lifted is drawn up into the discharge pipe. The inner or upper end of the inlet and suction pipe 11 is reduced on its outer side for a suitable distance and to a sufficient extent to permit said end of the pipe 11 to project to a greater or less distance into the lower end of the discharge pipe 1, said reduced upper end of the pipe 11 having an outside diameter slightly less than the inside diameter of the discharge pipe 1, whereby a space is formed between said reduced inner end of the pipe 11 and the inner side of the discharge pipe. The shoulder 12 produced by the reduced upper end of the pipe 11 is formed on an angle or bevel corresponding to the angle or bevel 4 of the lower end of the discharge pipe 1, said beveled or angular surfaces coacting to form an annular inwardly and upwardly extending inlet passage 13. The outer end of the passage 13 communicates with the space in the cylinder 5, while the inner end thereof connects with the space between the inner end of the suction pipe 11 and the lower end of the discharge pipe 1, as shown. The reduced inner end of the pipe 11 which projects above the shoulder 12 and into the lower end of the pipe 1 forms an annular air deflecting flange 14, which prevents the air entering the passage 13 from forming a cone in the pipe 1 and directs said air upwardly around the inner surface of the discharge pipe, as will be readily understood. By deflecting or directing the course of the air in this manner, the air will be prevented from breaking the column of water or other material being carried up by the suction of air through the discharge pipe.

In order to obtain the best results under varying conditions, it is necessary to regulate or control the admission of air through the discharge pipe and by constructing and arranging the inlet and suction pipe 12 as herein shown and described, the admission of the air is regulated or readily controlled by screwing the pipe 11 inwardly or outwardly in the threaded lower end of the cylinder 5 to a greater or less extent, thereby increasing or diminishing the size of the air inlet passage 13, thus permitting more or less air to enter the discharge pipe from the air space in the collar 5.

The lower end of the pipe 11 projects to a greater or less distance below the lower end of the cylinder 5 and on said projecting end of the pipe 11 is screwed a base ring 15, between which and the lower end of the collar 5 is a packing ring or gasket 16. In the base ring 15 are secured short supportings legs 17, which support the device in the well or other place where the same is to be used, and which space the lower end of the pipe 11 a suitable distance above the ground or bottom of the well in which the lift is arranged.

By means of an air suction lift constructed in accordance with my invention, it will be seen that the same will operate with equal advantage submerged or on sump or foundation work, and may be successfully employed in tanks, dry-docks, sewers and will readily lift water, oil, or other liquid, quick-sand, dry material or any substance which can be sucked into the inlet and suction pipe 11 by the discharge of the air through the pipe 1.

From the foregoing description, taken in connection with the accompanying drawings, the construction and operation of the invention will be readily understood without requiring a more extended explanation.

Various changes in the form, proportion and the minor details of construction may be resorted to without departing from the principle or sacrificing any of the advantages of this invention, as claimed;

Having thus described my invention, what I claim is:

In an ejector, the combination of a discharge pipe having the edge of its lower end beveled inwardly, a suction pipe having one end reduced and projected within said discharge pipe, a beveled shoulder formed by said reduced end and adapted to coact with the beveled end of said discharge pipe to form an inwardly and upwardly inclined air passage the effective cross sectional area of which may be increased or diminished by longitudinal movement of said suction pipe, and an air deflecting flange formed on the projected end of said suction pipe above the shoulder thereon, whereby air cone formation is prevented and the substance lifted carried through the discharge pipe in an unbroken condition.

In testimony whereof I have hereunto set my hand in presence of two subscribing witnesses.

GUSTAV WALLBILLICH.

Witnesses:
WILLIAM LEDINGHAM,
DENNIS DELBY.

---

Copies of this patent may be obtained for five cents each, by addressing the "Commissioner of Patents, Washington, D. C."